United States Patent Office.

FREDERICK WILLIAM ATACK, OF MANCHESTER, ENGLAND, AND GEORGE ROBERTSON, OF COUPER ANGUS, SCOTLAND.

HALOGENATION OF ANTHRAQUINONE DERIVATIVES.

1,401,125.   Specification of Letters Patent.   Patented Dec. 27, 1921.

No Drawing.   Application filed June 3, 1921. Serial No. 474,756.

*To all whom it may concern:*

Be it known that we, FREDERICK WILLIAM ATACK and GEORGE ROBERTSON, subjects of the King of Great Britain, residing in Manchester, in the county of Lancaster, England, and Couper Angus, Scotland, respectively, have invented certain new and useful Improvements in the Halogenation of Anthraquinone Derivatives, of which the following is a specification.

The present invention relates to improvements in the halogenation of anthraquinone derivatives.

We have discovered that if chlorination of 1.hydroxy-anthraquinone (for example) is performed in presence of a hot aromatic liquid and a reagent capable of neutralizing the hydrochloric acid produced, it is possible to obtain excellent yields of 1-chlor-4-hydroxy-anthraquinone, whereas in the absence of such a reagent, unsatisfactory results are obtained, the end product formed not being of the same degree of purity. The addition of a neutralizing agent accelerates the completion of the chlorination, and further enables the progress of the reaction to be better ascertained. The addition of the neutralizing agent is therefore a great technical advantage.

The invention also extends to other anthraquinone derivatives especially acylamino-anthraquinones. Unsubstituted amino-anthraquinones are not included since they can be readily chlorinated in cold liquids.

It is desirable to avoid side reactions *e. g.* between the halogenating agent, the aromatic liquid and the neutralizing agent, and it is therefore best to use a mild alkaline reagent, rather than caustic alkalis. An inert organic liquid is preferred to liquids such as glacial acetic acid, which although suitable in some respects, reacts with chlorin when heated.

Chlorination may conveniently be performed by direct action of free chlorin in nitrobenzene suspension, and iodin may be added as a carrier if desired.

*Example 1.*

22.4 parts by weight 1-hydroxyanthraquinone, 48 parts by weight nitro-benzene, 6 parts by weight anhydrous sodium carbonate and 0.5 parts by weight of iodin were heated together and chlorin passed in until the necessary increase in weight has occurred. After allowing to cool, the product was filtered off, washed with alcohol, and dried. On recrystallization from glacial acetic acid 1-chlor-4-hydroxyanthraquinone of melting point 190°–192° C. (corr) was obtained.

*Example 2.*

15 parts by weight of finely powdered alizarin bordeaux, 6 parts by weight of anhydrous sodium carbonate and 240 parts by weight of nitrobenzene, are heated to boiling to expel moisture. Then the mixture is cooled to 120°–150° C. and chlorin gas is passed in until the necessary increase of weight for monochlorination has occurred. The nitrobenzene is removed by steam distillation and the chlorinated bordeaux filtered from the aqueous liquor; the product has a M. P. 210–212° C.

*Example 3.*

22.4 parts by weight of 1.hydroxyanthraquinone and 12 parts by weight of anhydrous sodium carbonate are added to 120 parts by weight of nitrobenzene and ½ part by weight of iodin is added. Chlorination is effected by passing in chlorin gas at 115°–120° C. until the necessary increase in weight for dichlorination has occurred. The product is filtered from the cooled reaction-mixture, washed with alcohol and dried, giving 2.4 dichlor. 1.hydroxyanthraquinone of M. P. 238–240° C.

*Example 4.*

16 parts by weight of 1.benzoylamin-anthraquinone, 120 parts by weight of nitrobenzene, 3 parts by weight of sodium carbonate and ½ part by weight of iodin are treated with chlorin gas at 120°–125° C. until the necessary increase in weight for monochlorination has occurred. The product crystallizes out on cooling and has M. P. 253°–255° C.

*Example 5.*

48 parts by weight of alizarin, 28 parts by weight sodium carbonate, 1 part by weight iodin, and 480 parts by weight nitrobenzene are heated to a temperature of 100°–110° C. and chlorin passed in until an increase in weight corresponding to the formation of a dichlor derivative is obtained. On cooling the product crystallizes out and is filtered, freed from nitrobenzene and dried. The product contains 21.9% Cl (required for dichloralizarin 22.5%) and has a melting point of 244°–246° C.

Example 6.

12 parts by weight of anthrarufin, 60 parts by weight of nitrobenzene, 3 parts by weight of sodium carbonate, and 0.25 parts by weight of iodin are heated together to a temperature of 110–120° C. and chlorin introduced until the necessary increase in weight for the formation of a monochlor derivative has occurred. On cooling the product crystallizes out and is filtered, washed and dried. The substance has all the properties ascribed to monchloranthrarufin in G. P. 167,743.

Example 7.

24 parts by weight of anthrarufin, 120 parts by weight of nitrobenzene, 12 parts by weight of sodium carbonate, 1 part by weight of iodin are heated together in a stream of chlorin until the required increase in weight for the formation of a dichlor derivative has occurred. After allowing to cool, the product is isolated in the usual manner. The yield is almost quantitative. The reactions of the compound are similar to those described for dichlor-anthrarufin in G. P. 167,743 and in G. P. 282,494.

Example 8.

11.2 parts by weight of 1-hydroxyanthraquinone, 120 parts by weight of nitrobenzene, and 5 parts by weight of sodium carbonate are heated together to a temperature of 100–110° C. and a solution of 8 parts by weight of bromin in 25 parts of nitrobenzene are gradually introduced. Heating is continued for an hour after the addition of the bromin solution. Thereafter on cooling the product crystallizes out and can be filtered off. On recrystallization from glacial acetic acid the product has a melting point of 190°–192° C. which is the figure quoted in the literature for 1-hydroxy-4-bromanthraquinone.

Example 9.

22.4 parts by weight of 2-hydroxyanthraquinone, 10 parts by weight of sodium carbonate, 200 parts by weight of nitrobenzene, and 1 part by weight of iodin are heated to 130–140° C. and chlorin passed in until the required increase in weight for the formation of a monchlor derivative is obtained. The product is isolated in the usual way and on recrystallization from alcohol has a melting point of 226° C. which is that quoted for 1-chloro-2-hydroxyanthraquinone.

Other neutralizing agents can be employed, e. g. borax or magnesium oxid; sodium acetate is not so good because of the side reaction occurring between the chlorin and the acetate.

Other aromatic solvents can be employed e. g. trichlorbenzene, but nitrobenzene appears most satisfactory.

Similar considerations apply in the case of bromination.

It has been proposed to chlorinate 1.hydroxyanthraquinone in nitrobenzene suspension by means of sulfuryl chlorin but no suggestion was made to use free chlorin or to add a neutralizing agent.

We declare that what we claim is:—

1. The process of halogenating anthraquinone derivatives in a hot aromatic liquid in presence of a neutralizing agent.

2. The process of halogenating hydroxyanthraquinones in a hot aromatic liquid in presence of a neutralizing agent.

3. The process of chlorinating hydroxyanthraquinones in a hot aromatic liquid by the action of free chlorin gas.

4. The process of halogenating anthraquinone derivatives in hot nitrobenzene in presence of a neutralizing agent.

5. The process of halogenating hydroxyanthraquinones in hot nitrobenzene in presence of a neutralizing agent.

6. The process of chlorinating hydroxyanthraquinones in hot nitrobenzene by the action of free chlorin gas.

7. The process of halogenating anthraquinone derivatives in a hot inert aromatic liquid in presence of a neutralizing agent.

8. The process of halogenating hydroxyanthraquinones in a hot inert aromatic liquid in presence of a neutralizing agent.

9. The process of chlorinating hydroxyanthraquinones in a hot inert aromatic liquid by the action of free chlorin gas.

10. The process of halogenating anthraquinone derivatives in a hot aromatic liquid in presence of a mild alkaline agent.

11. The process of halogenating hydroxyanthraquinone in a hot aromatic liquid in presence of a mild alkaline agent.

12. The process of halogenating anthraquinone derivatives in a hot aromatic liquid in presence of a neutralizing agent insoluble in the aromatic liquid.

13. The process of halogenating hydroxyanthraquinones in a hot aromatic liquid in presence of a neutralizing agent insoluble in the aromatic liquid.

14. The process of chlorinating anthraquinone derivatives in a hot aromatic liquid in presence of a neutralizing agent by the action of free chlorin gas.

In witness whereof, we have hereunto signed our names this 13th day of May, 1921, in the presence of two subscribing witnesses.

FREDERICK WILLIAM ATACK.
GEORGE ROBERTSON.

Witnesses:
JOHN McLACHLAN,
T. V. STIRK.